United States Patent Office 2,889,359
Patented June 2, 1959

2,889,359

ESTERS OF 2,3-DICHOLORDIOLS AND PROCESS FOR THEIR PRODUCTION

Howard R. Guest, Charleston, and Harry A. Stansbury, Jr., South Charleston, W. Va., assignors to Union Carbide Corporation, a corporation of New York No Drawing. Application December 3, 1956
Serial No. 625,610

9 Claims. (Cl. 260—488)

This invention relates to certain esters of 2,3-dichlorodiols and to a process for their production. More particularly, the present invention relates to diesters of 2,3-dichloro-1,1-diols.

The novel compounds of the present invention may be represented by the general formula:

$$R''-\underset{\underset{H}{|}}{\overset{\underset{Cl}{|}}{C}}-\underset{\underset{R'}{|}}{\overset{\underset{Cl}{|}}{C}}-\underset{O-\overset{O}{\overset{\|}{C}}-R}{\overset{O-\overset{O}{\overset{\|}{C}}-R}{C}}\text{H}$$

wherein R is an alkyl group containing from 1 to 7 carbon atoms, and R' and R'' are members selected from the class consisting of hydrogen and methyl.

Illustrative of the novel compounds of the present invention are 2,3-dichloropropylidene diacetate, 2,3-dichloropropylidene dipropionate, 2,3-dichloropropylidene dibutyrate, 2,3-dichloropropylidene divalerate, 2,3-dichloropropylidene dihexanoate, 2,3-dichloropropylidene, diheptanoate, 2,3-dichloropropylidene dicaprylate, 2-methyl-2,3-dichloropropylidene diacetate, 2-methyl-2,3-dichloropropylidene dipropionate, 2-methyl-2,3-dichloropropylidene dibutyrate, 2-methyl-2,3-dichloropropylidene divalerate, 2-methyl-2,3-dichloropropylidene dihexanoate, 2-methyl-2,3-dichloropropylidene diheptanoate, 2-methyl-2,3-dichloropropylidene dicaprylate, 2,3-dichlorobutylidene diacetate, 2,3-dichlorobutylidene dipropionate, 2,3-dichlorobutylidene dibutyrate, 2,3-dichlorobutylidene divalerate, 2,3-dichlorobutylidene dihexanoate, 2,3-dichlorobutylidene diheptanoate, 2,3-dichlorobutylidene dicaprylate.

The compounds of the present invention can be prepared by reacting an unsaturated diester having the formula:

$$R''-HC=\underset{\underset{R'}{|}}{C}-C\underset{O-\overset{O}{\overset{\|}{C}}-R}{\overset{O-\overset{O}{\overset{\|}{C}}-R}{H}}$$

wherein R, R' and R'' having the values given above, with at least an equimolecular amount of chlorine, which can be fed over a period of from about 1 to 8 hours. The reaction may be conducted at a temperature of from about −20° C. to about 50° C. but is preferably conducted at a temperature of from about 0° C. to about 20° C. The reaction is preferably conducted in a reaction medium such as carbon tetrachloride, ethylene dichloride, chloroform, propylene dichloride, benzene, or the like, with constant agitation. After the reaction is complete (from 10 to 60 minutes after the chlorine has been fed), the reaction mixture can be stripped at 80° C. to 140° C. and 1 to 50 mm. Hg to leave the desired 2,3-diol diester as the residue product.

The unsaturated diester starting materials can be prepared in accordance with the teachings of McTeer in copending application Serial Number 574,615, filed March 29, 1956. Briefly, the process comprises reacting an aldehyde having the formula $$R''-HC=\underset{\underset{R'}{|}}{C}-O\diagdown\overset{H}{\underset{O}{\diagup}}$$

with an anhydride having the formula $$O\diagup\overset{\overset{O}{\|}}{\underset{\underset{\|}{O}}{C}}-R\diagdown\overset{}{\underset{C-R}{}}$$

wherein R, R' and R'' have the values given above, at a temperature of from −20° C. to 100° C. in the presence of a boric acid-oxalic acid catalyst.

The following examples are illustrative:

EXAMPLE I

*Preparation of 2,3-dichloropropylidene diacetate*

A solution of 205 grams of allylidene diacetate (1.3 moles) in 400 grams of carbon tetrachloride was saturated with gaseous chlorine while stirring at 10° C.–18° C. The solution was stripped to a maximum kettle temperature of 100° C. under a reduced pressure of 10 millimeters. The colorless residue product had these properties: Specific gravity 20/20° C. 1.368, n 30/D 1.4600, 32.5 percent Cl (theory 31.0 percent), molecular weight by the Menzies-Wright method 251 (theory 229). The yield was 94 percent.

EXAMPLE II

*Preparation of 2,3-dichloropropylidene dibutyrate*

A solution of 100 grams of allylidene dibutyrate in 100 grams of carbon tetrachloride was saturated with chlorine at 20° C. The mixture was stripped to a maximum kettle temperature of 100° C., under a reduced pressure of 3 millimeters to obtain 2,3-dichloropropylidene dibutyrate having these properties: Specific gravity 20/20° C. 1.178, 26.6 percent Cl (theory 24.9 percent).

EXAMPLE III

*Preparation of 2,3-dichloropropylidene dihexanoate*

A solution of 64 grams of allylidene dihexanoate in 100 cubic centimeters of carbon tetrachloride was saturated with chlorine at 20° C. The mixture was stripped to a kettle temperature of 100° C., at 2 millimeters, to obtain a residue product having these properties: Specific gravity 20/20° C. 1.186, 28.0 percent Cl (theory 20.8 percent). The yield was 94 percent.

EXAMPLE IV

*Preparation of 2,3-dichlorobutylidene diacetate*

Crotylidene diacetate (102 grams, 0.6 mole) in 200 grams of carbon tetrachloride was chlorinated at −5° C. until 46 grams (0.6 mole) were absorbed. The mixture was stripped to a kettle temperature of 90° C., under a reduced pressure of 20 millimeters. The residue product had the following properties: Specific gravity 20/20° C. 1.268, n 30/D 1.4532, 28.5 percent Cl (theory 29.2 percent), molecular weight by the Menzies-Wright method 244 (theory 243). The yield was 85 percent.

EXAMPLE V

Preparation of 2,3-dichloro-2-methylpropylidene diacetate

A solution of 172 grams of 2-methylallylidene diacetate (1 mole) in 300 grams of carbon tetrachloride was stirred at 0° C., while chlorine was fed until 79 grams (1.1 moles) were absorbed. The mixture, which was faintly yellow due to a slight excess of chlorine, was stripped to a kettle temperature of 90° C., at 20 millimeters to obtain a residue product having these properties: Specific gravity 20/20° C. 1.276, n 30/D 1.4580, 29.2 percent Cl (theory 29.2 percent), molecular weight by the Menzies-Wright method 220 (theory 243). The yield was 71 percent.

EXAMPLE VI 1,1-diacetoxy-2-butene (crotylidene diacetate) was prepared by reacting acetic anhydride and crotonaldehyde in the presence of a boric acid-oxalic acid catalyst, which was prepared by dissolving 6.2 grams of boric acid and 12.6 grams of oxalic acid in 44 milliliters of water at a temperature of 60° C., and evaporating the mixture to dryness under a pressure of 30 mm. Hg, absolute, at a temperature of 80° C. In carrying out the reaction, 2.0 grams of the catalyst was dissolved in 260 grams of acetic anhydride. Crotonaldehyde, in the amount of 142 grams, was then slowly added to the catalyst solution while cooling and agitating the solution. The entire mixture was then placed in a reaction flask immersed in a cooling water bath and equipped with a stirrer. Over a period of 5 hours a second mixture consisting of 2330 grams of acetic anhydride and 1252 grams of crotonaldehyde was fed into the first mixture containing the catalyst. The reaction mixture was maintained at 25° C.–30° C. by cooling. After addition of the second mixture had been completed the final reaction mixture was allowed to stand two additional hours at 25° C. after which the catalyst was neutralized by the addition of 2.6 grams of sodium acetate and the mixture distilled under reduced pressure. The refined 1,1-diacetoxy-2-butene was distilled off at a vapor temperature of 89° C. at a pressure of 10 millimeters Hg. It had a specific gravity of 1.057 at 20/20° C. and a refractive index of 1.4290 at 20° C. Purity of the material was 102.8 percent based on saponification and 99.0 percent based on unsaturation. Based on crotonaldehyde, the yield and efficiency were 94.2 and 96.0 percent, respectively, while based on acetic anhydride they were 73.8 and 94.8 percent.

EXAMPLE VII 1,1-diacetoxypropene (allylidene diacetate) was prepared by reacting acrolein and acetic anhydride in the presence of a boric acid-oxalic acid catalyst prepared as in Example VI. In carrying out the reaction, 6 grams of the catalyst was dissolved in 3030 grams of acetic anhydride. Over a period of one hour, there were fed 832 grams of 93.7 percent acrolein. The reaction temperature was maintained at 40° C. After the mixing was complete the mixture was allowed to stand for two hours at a temperature of 35° C. after which the catalyst was neutralized by the addition of 7.3 grams of sodium acetate and the mixture was distilled. The refined 1,1-diacetoxy-propene was distilled over and recovered at a boiling point of 73° C. at 8 millimeters Hg pressure. Based on acrolein, the yield and efficiency to 1,1-diacetoxypropene were both 69.0 percent. Based on acetic anhydride, they were 32.3 and 56.7 percent, respectively. A by-product, identified as 1,3-diacetoxypropene, was produced at the rate of one mole per each 4.4 moles of 1,1-diacetoxypropene. The by-product was the result of isomerization of the primary product.

EXAMPLE VIII

Acetic anhydride and methacrolein were reacted in the presence of a catalyst consisting of boric and oxalic acids to produce 1,1-diacetoxy-2-methyl-2-propene (2-methyl allylidene diacetate). In 2147 grams of acetic anhydride there was dissolved 1.7 grams of catalyst which was prepared as in Example VI. Over a period of 2 hours, 1260 grams of 93.3 percent methacrolein was fed into the reaction. Temperature of the reaction was maintained between 30° C. and 40° C. by cooling in a water bath. After all the aldehyde had been added the mixture was allowed to stand for one hour. The catalyst was then neutralized by the addition of 3.0 grams of sodium acetate after which the mixture was distilled. The refined 1,1-diacetoxy-2-methyl-2-propene was distilled off at a vapor temperature of 80–82° C. at 8 millimeters pressure. It had a specific gravity of 1.039 at 27/20° C. and a refractive index of 1.4221 at 20° C. Based on methacrolein the yield and efficiency were 47.9 and 74.7 percent, respectively, while based on acetic anhydride they were 38.6 and 80.4 percent.

The compounds of this invention are useful as plasticizers for vinyl resins and as solvents for a wide variety of compounds. They are also useful as herbicides. Their herbicidal activity is demonstrated by a series of tests which were conducted in the following manner. In each test 25 radish seeds (var. Burpee's Red Globe) were placed on a piece of filter paper in a Petri dish. Then 10 ml. of a 0.1 percent (by weight) aqueous solution of the chemical being tested, either in emulsion or in suspension, were placed in the Petri dish. After five days the seeds were observed for germination. The results of these experiments are summarized in the table below. The results are given as the percentage of seeds germinating. In comparison with these results, untreated seeds, used as a control, showed 100 percent germination.

Table

| Compound: | Percent germination |
|---|---|
| 2,3-dichloropropylidene diacetate | 0 |
| 2,3-dichlorobutylidene diacetate | 0 |
| 2-methyl-2,3-dichloropropylidene diacetate | 0 |
| 2,3-dichloropropylidene dihexanoate | 80 |

We claim:

1. A 2,3-dichlorodiol diester having the general formula:

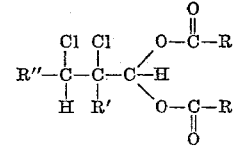

wherein R is an alkyl group containing from 1 to 7 carbon atoms, and R' and R" are hydrogen or methyl.

2. A 2,3-dichlorodiol diester having the general formula:

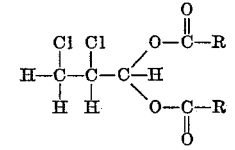

wherein R is an alkyl group containing from 1 to 7 carbon atoms.

3. A 2,3-dichlorodiol diester having the general formula:

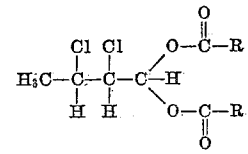

wherein R is an alkyl group containing from 1 to 7 carbon atoms.

4. 2,3-dichlorodiol diester having the general formula:

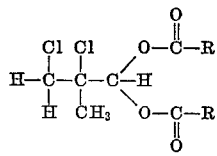

wherein R is an alkyl group containing from 1 to 7 carbon atoms.

5. 2,3-dichloropropylidene diacetate.
6. 2,3-dichloropropylidene dibutyrate.
7. 2,3-dichloropropylidene dihexanoate.
8. 2-methyl-2,3-dichloropropylidene diacetate.
9. 2,3-dichlorobutylidene diacetate.

References Cited in the file of this patent
UNITED STATES PATENTS 2,463,227   Walker _____ Mar. 1, 1949

OTHER REFERENCES

Kirrmann: Bull. Soc. Chim. France Memoires 1938, p. 256–60.

Noller: Chemistry of Organic Compounds (1951), p. 675–6.

Schmid et al.: Helv. Chim. Acta 32, 79, 83, 84 (1949).